(12) United States Patent
Takahashi

(10) Patent No.: US 6,321,160 B1
(45) Date of Patent: Nov. 20, 2001

(54) NAVIGATION APPARATUS

(75) Inventor: Takeshi Takahashi, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/528,999

(22) Filed: Mar. 20, 2000

(30) Foreign Application Priority Data

Mar. 31, 1999 (JP) .................................................. 11-092588

(51) Int. Cl.$^7$ .............................. G01C 21/00; G01S 5/00; G06F 7/00; G06F 17/00; G06F 19/00
(52) U.S. Cl. .......................... 701/209; 701/200; 701/201; 701/208; 701/210–213; 364/440; 364/449; 340/990; 340/991; 340/995; 340/996; 342/358; 342/451; 342/457; 342/458
(58) Field of Search ..................................... 701/208–213, 701/200, 201; 364/449, 440; 340/991, 988, 996, 990; 342/451, 358, 457, 458

(56) References Cited

U.S. PATENT DOCUMENTS

| | | | |
|---|---|---|---|
| 5,130,709 | * 7/1992 | Toyama et al. | 340/995 |
| 5,272,638 | * 12/1993 | Martin et al. | 364/444 |
| 5,452,212 | * 9/1995 | Yokoyama et al. | 364/449 |
| 5,465,089 | * 11/1995 | Nakatami et al. | 340/995 |
| 5,485,161 | * 1/1996 | Vaughn | 342/357 |
| 5,974,357 | * 10/1999 | Poonsaengsathit et al. | 701/210 |

FOREIGN PATENT DOCUMENTS

| | | |
|---|---|---|
| 1004850-A1 | * 12/1999 | (DE) . |
| 6186051 | 7/1994 | (JP) . |
| 10206176 | 8/1998 | (JP) . |

* cited by examiner

Primary Examiner—William A. Cuchlinski, Jr.
Assistant Examiner—Ronnie Mancho
(74) Attorney, Agent, or Firm—Stevens, Davis, Miller & Mosher, LLP

(57) ABSTRACT

A car navigation apparatus includes a route setting unit for setting a route; an own car position detection unit for measuring an own car position and detecting the own car position; and an advance direction detection unit for detecting an advance direction of the own car. The car navigation apparatus further includes a turning intersection detection unit for detecting an intersection where the own car should turn next time, on the route located within a predetermined distance in the advance direction from the own car position; and a turning intersection display unit responsive to detection of a turning intersection to display the shape of the turning intersection and a direction to which the own car should turn, acquired from map information stored in a map information storage unit, on the display screen using figures, and to display the distance to the turning intersection and the name of the turning intersection on the display screen using characters.

12 Claims, 11 Drawing Sheets

NAVIGATION APPARATUS

BACKGROUND OF THE INVENTION

The present invention relates to a car navigation apparatus which is improved in a display method of a road guide as far as a destination and which has the high user's operability, and a guide display method thereof.

DESCRIPTION OF RELATED ART

In recent years, there have been used widely a car navigation apparatus capable of displaying the position of an automobile or the like during its movement by utilizing the GPS (Global Positioning System) which is a positioning system for receiving navigation radio waves radio-transmitted from a plurality of GPS satellites to the ground to detect a current position.

When using such a navigation apparatus, the user watches a map and a guide displayed on a display screen of the navigation apparatus, and determines the direction in which the car should advance in order to arrive at the destination. Therefore, there is demanded a car navigation apparatus capable of conducting such a display that a guide or the like displayed on a display screen can be readily understood by a user.

As a conventional car navigation apparatus and a guide display method thereof, "Direction display method in a car navigation system" is disclosed in JP-A-10-206176. The direction display method is characterized by comprising the steps of: finding out map data and map related data including a current position of an own car from a map database; finding out an intersection node which is located on a road in an advance direction of the own car and which is located the nearest to the current own car position, from the map related data; reading out intersection direction name information from the map database together with the map data; and displaying the intersection direction name information of the intersection node read out on a display screen of a display device together with the map data.

Furthermore, in JP-A-6-186051, "Car navigation apparatus to be mounted on car" is disclosed. The car navigation apparatus is characterized by comprising: map information storage means for storing map information; own car position detection means for detecting a current position of an own car; advance direction detection means for detecting an advance direction of the own car based on the current position detected by the own car position detection means; display means for displaying the advance direction of the own car detected by the advance direction detection means and the current position of the own car detected by the own car position detection means on a map including them; input means for inputting at least a departure place and a destination place; guidance route setting means for setting a guidance route coupling the departure place to the destination place and causing the display means to display the set guidance route; guidance route decision means for making a decision as to whether or not an intersecting road is a part of the guidance route when the own car has approached an intersection; and guidance route information display means for causing the display means to display turning intersection information concerning an intersection where the own car should turn, on the display means when the intersecting road is judged to be a part of the guidance route by the guidance route decision means.

Hereafter, the "car navigation apparatus to be mounted on car" disclosed in JP-A-6-186051 will be described referring to drawing.

FIG. 11A is a diagram showing an example of a wide area diagram displayed on a display screen of the "car navigation apparatus to be mounted on car" disclosed in JP-A-6-186051. FIGS. 11B and 11C are enlarged views each showing an enlarged view of a partial area of the wide area diagram shown in FIG. 11A.

In FIGS. 11A–11C, reference numeral 200 denotes a wide area diagram displayed on the display screen of the car navigation apparatus. Reference numerals 201 and 202 denote a departure point and a destination point, respectively. Reference numeral 203 denotes an area shown in the enlarged view of FIG. 11B. Reference numeral 204 denotes an area shown in the enlarged view of FIG. 11C. Reference numeral 205 denotes a route ranging from the departure point 201 to the destination point 202. Reference numeral 206 denotes an enlarged view of the area 203 of FIG. 11A. Reference numeral 207 denotes an enlarged view of the area 204 of FIG. 11A. Reference numeral 208 denotes an own car mark indicating an own car's position. Each of reference numerals 209 and 210 denotes an information display area for displaying information of an intersection or the like.

In the "car navigation apparatus to be mounted on car" disclosed in JP-A-6-186051, the user registers the departure point 201 and the destination point 202 by executing a guidance route setting processing program. At this time, the optimum route 205 linking the departure point 201 with the destination point 202 is automatically set and displayed on the display screen. In case the above-described guidance route setting is conducted, the own car mark 208 indicating the position of the own car is displayed on the map displayed on the display screen. As shown in FIGS. 11B and 11C, the advance direction of the car is indicated by a front end of a triangular mark of the own car mark 208. On the basis of the position of the own car, the guidance route decision means determines whether or not there is on the guidance route an intersection where the own car have not reached and should turn. Unless there is an intersection where the own car should turn, the guidance route decision means displays a distance to the destination in the information display area 209 as shown in FIG. 11B. If there is an intersection where the own car should turn, then the guidance route decision means searches for an intersection located in the advance direction of the own car where the own car should turn, calculates the distance between the own car and the intersection where the own car should turn, displays a detailed map around the intersection in the information display area 210, together with the distance to the destination, the distance to the intersection, and the direction of the turning.

However, the above-described conventional car navigation apparatus and the guide display method thereof have the following problems.

(1) It is now assumed that the user has set a route in the car navigation apparatus and causes the car navigation apparatus to guide to the destination. If there is an intersection where the own car should turn, then the distance to the intersection where the own car should turn is displayed. However, it is difficult for the user to intuitively know in what place of the forward scenery there is a way to which the own car should turn. This results in a problem that the user is apt to commit an error and consequently the operability is poor.

(2) Although the shape of an intersection where the own car should turn and the direction to which the own car should turn are displayed on the map, it is difficult to intuitively associate them with the forward scenery. This results in a problem that the user is apt to make an error and consequently the operability is poor.

SUMMARY OF THE INVENTION

The present invention solves the above-described problems of the conventional technique. An object of the present invention is to provide a car navigation apparatus capable of conducting a guide causing fewer mistakes, by performing such a guide display that a user can intuitively understand with ease, and consequently having the high operability.

The present invention solves the above-described problems of the conventional technique. Another object of the present invention is to provide a guide display method of a car navigation apparatus capable of conducting a guide causing fewer mistakes, by performing such a guide display that a user can intuitively understand with ease.

DETAILED DESCRIPTION OF THE EMBODIMENTS

Figure 1:
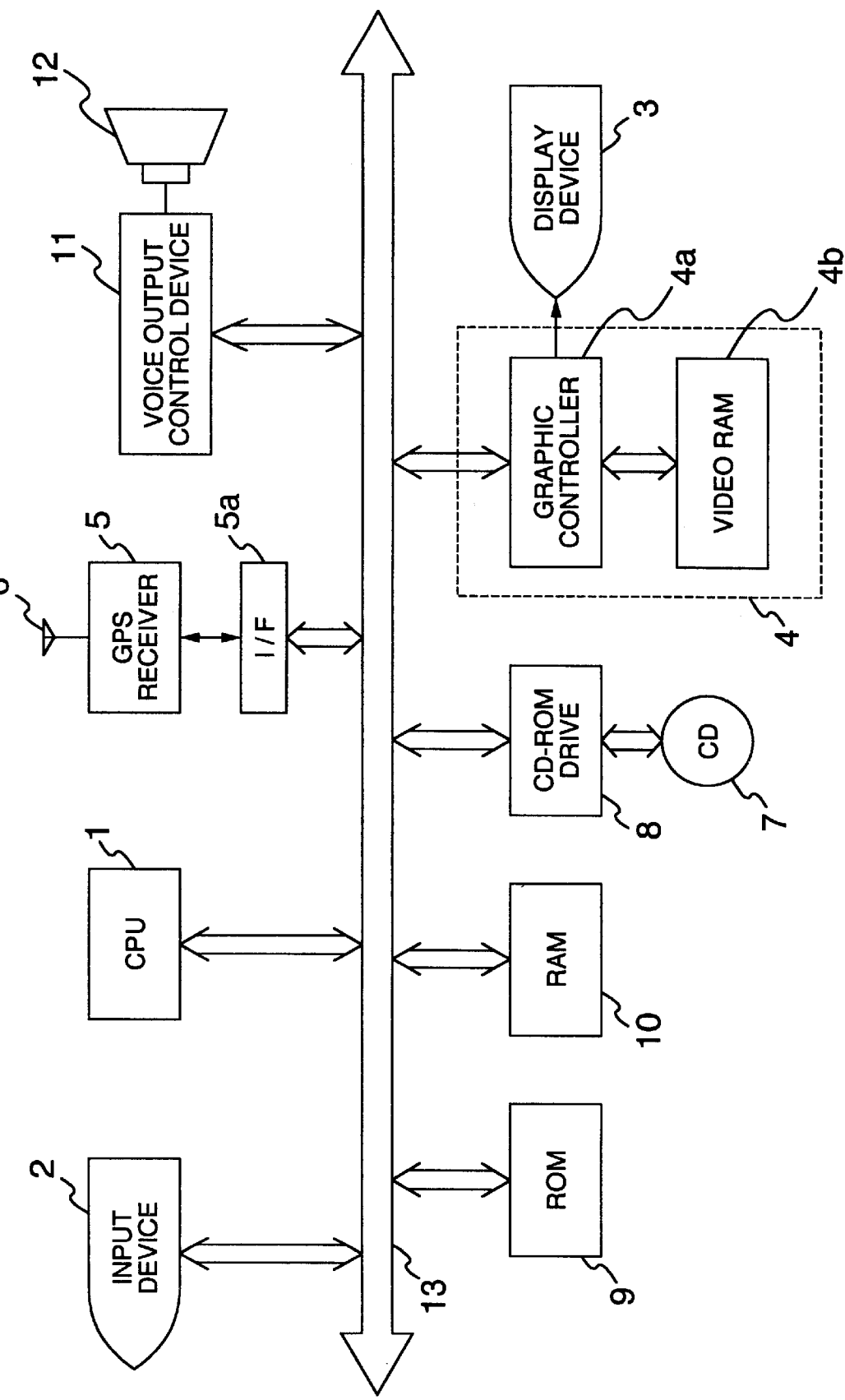
FIG. 1 is a block diagram showing the apparatus configuration of a car navigation apparatus in an embodiment of the present invention.

Hereafter, an embodiment of the present invention will be described referring to the drawing.

FIG. 1 is a block diagram showing the apparatus configuration of a car navigation apparatus in an embodiment of the present invention.

In FIG. 1, reference numeral 1 denotes a CPU (central processing unit) for controlling the operation of the car navigation apparatus. Reference numeral 2 denotes an input device with which a user inputs an operation instruction or the like into the CPU 1. Reference numeral 3 denotes a display device on which the CPU 1 displays a processing result. Reference numeral 4 denotes a display control device for controlling the display operation of the display device 3. Reference numeral 4a denotes a graphic controller for conducting a screen display processing of the display device 3 based on the inputted image information or the like. Reference numeral 4b denotes a video RAM for temporarily storing image data inputted from the graphic controller 4a to be displayed on the display device 3. Reference numeral 5 denotes a GPS receiver for measuring the position of an own car by GPS and outputting it. Reference numeral 5a denotes an interface for converting an input from the GPS receiver 5 into data which can be inputted into and outputted from the CPU 1. Reference numeral 6 denotes an antenna for receiving navigation radio waves transmitted from a GPS satellite. Reference numeral 7 denotes a CD-ROM (read only compact disk memory) having map information or the like recorded thereon. Reference numeral 8 denotes a CD-ROM drive for reading and outputting the information recorded on the CD-ROM 7. Reference numeral 9 denotes a ROM having a program for controlling the CPU 1, graphic data to be displayed on the display device 3, or the like recorded thereon. Reference numeral 10 denotes a RAM for storing data or the like temporarily generated at the time of operation of the CPU 1. Reference numeral 11 denotes a voice output control device for controlling voice output based on an instruction given by the CPU 1. Reference numeral 12 denotes a speaker for outputting a voice according to a voice signal inputted from the voice output control device 11. Reference numeral 13 denotes a bus line connected in common to the CPU 1, the input device 2, the display control device 4, the interface 5a, the CD-ROM drive 8, the ROM 9, the RAM 10, and the voice output control device 11.

Figure 2:
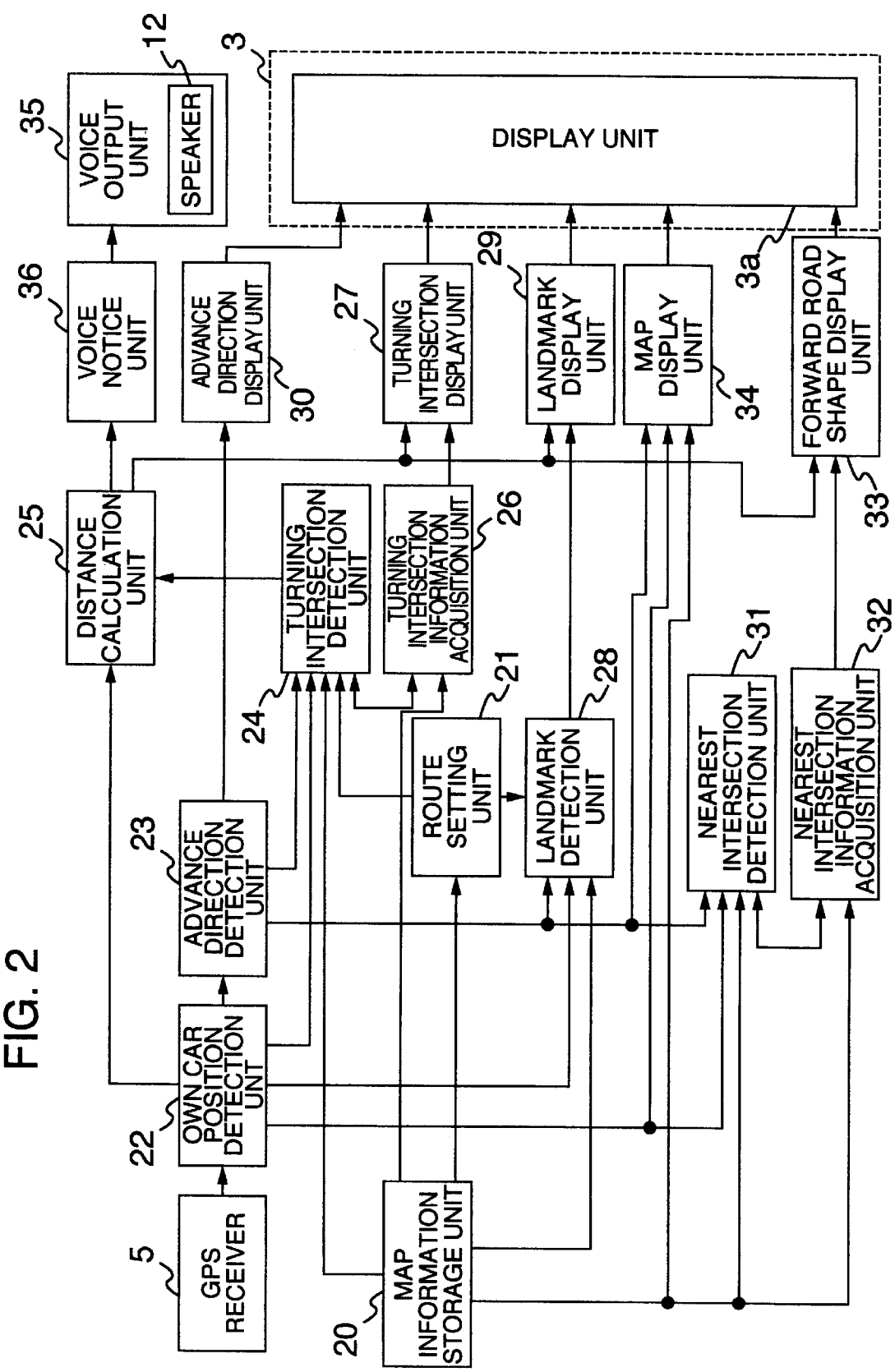
FIG. 2 is a block diagram showing the function configuration of a guide display operation of the car navigation apparatus in the embodiment.

FIG. 2 is a block diagram showing the function configuration of the guide display operation of the car navigation apparatus in the embodiment.

In FIG. 2, reference numeral 3 denotes a display device, 5 a GPS receiver, and 12 a speaker. These components are the same as those of FIG. 1. Therefore, they are denoted by the same reference numerals, and description thereof will be omitted.

Reference numeral 3a denotes a display screen of the display device 3 for displaying a map and information such as the position of the own car. Reference numeral 20 denotes a map information storage unit for storing map information, formed of the CD-ROM 7 and the CD-ROM drive 8. Reference numeral 21 denotes a route setting unit for setting a route of the user to the destination based on the map information stored in the map information storage unit 20. Reference numeral 22 denotes an own car position detection unit for measuring the coordinates (such as latitude and longitude) of the own car position based on a position information signal outputted from the GPS receiver 5 to detect the own car position. Reference numeral 23 denotes an advance direction detection unit for detecting the advance direction of the own car from a temporal change of the own car position. Reference numeral 24 denotes a turning intersection detection unit for detecting an intersection where the own car should turn next time (hereafter referred to as "turning intersection"), on the route located within a predetermined distance in the advance direction from the own car position, based on the map information stored in the map information storage unit 20. Reference numeral 25 denotes a distance calculation unit responsive to the detection of the turning intersection to calculate the distance between the own car position and the turning intersection. Reference numeral 26 denotes a turning intersection information acquisition unit responsive to the detection of the turning intersection to acquire the shape and name of the turning intersection from the map information stored in the map information storage unit 20. Reference numeral 27 denotes a turning intersection display unit for displaying the shape of the turning intersection acquired by the turning intersection information acquisition unit 26 and the direction to which the own car should turn, on the display screen 3a using figures, and for displaying the distance to the turning intersection calculated by the distance calculation means 25 and the name of the turning intersection acquired by the turning intersection information acquisition unit 26, on the display screen 3a using characters. Reference numeral 28 denotes a landmark detection unit for detecting a landmark (such as a store, post office or police station) on the route located within the predetermined distance in the advance direction from the own car position based on the map information stored in the map information storage unit 20. Reference numeral 29 denotes a landmark display unit responsive to the detection of the landmark by the landmark detection unit 28 to display a landmark symbol indicating the landmark on the display screen 3a. Reference numeral 30 denotes an advance direction display unit for displaying the advance direction detected by the advance direction detection unit 23 on the display screen 3a. Reference numeral 31 denotes a nearest intersection detection unit for detecting the nearest intersection located nearest among the intersections which are located within the predetermined distance in the advance direction from the own car position, based on the map information stored in the map information storage unit 20. Reference numeral 32 denotes a nearest intersection information acquisition unit responsive to the detection of the nearest intersection conducted by the nearest intersection detection unit 31 to acquire the shape and name of the nearest intersection from the map information stored in the map information storage unit 20. Reference numeral 33 denotes a forward road shape display unit responsive to the non-detection of the nearest intersection to display a straight road on the display screen 3a using figures, and responsive to the detection of the nearest intersection to display the shape of the nearest intersection acquired by the nearest intersection information acquisition unit 32 on the display screen 3a using figures and to display the name of the nearest intersection on the display screen 3a using characters. Reference numeral 34 denotes a map display unit for displaying a map on the display screen 3a based on the map information stored in the map information storage unit 20, and for displaying an own car mark indicating the own car position on the map based on the own car position detected by the own car position detection unit 22. Reference numeral 35 denotes a voice output unit for outputting a voice using the speaker 12. Reference numeral 36 denotes a voice notice unit responsive to the arrival of the distance to the turning intersection calculated by the distance calculation unit 25 at the predetermined distance to utter using the voice output unit 35 to notify that the own car has approached the turning intersection.

The above-described route setting unit 21, own car position detection unit 22, advance direction detection unit 23, turning intersection detection unit 24, distance calculation unit 25, turning intersection information acquisition unit 26, landmark detection unit 28, nearest intersection detection unit 31, nearest intersection information acquisition unit 32, voice notice unit 36, turning intersection display unit 27, landmark display unit 29, advance direction display unit 30, forward road shape display unit 33, and map display unit 34 are formed of a program stored in the ROM 9. The CPU 1 conducts the processing according to the program. As a result, the operation of the apparatus is executed. While the present embodiment has such a configuration as to execute the operation by the program processing using the general purpose CPU 1, it may be formed using dedicated logic circuits.

Hereafter, a guide display method in the car navigation apparatus of the present embodiment having the configuration heretofore described will be described.

Figure 3:
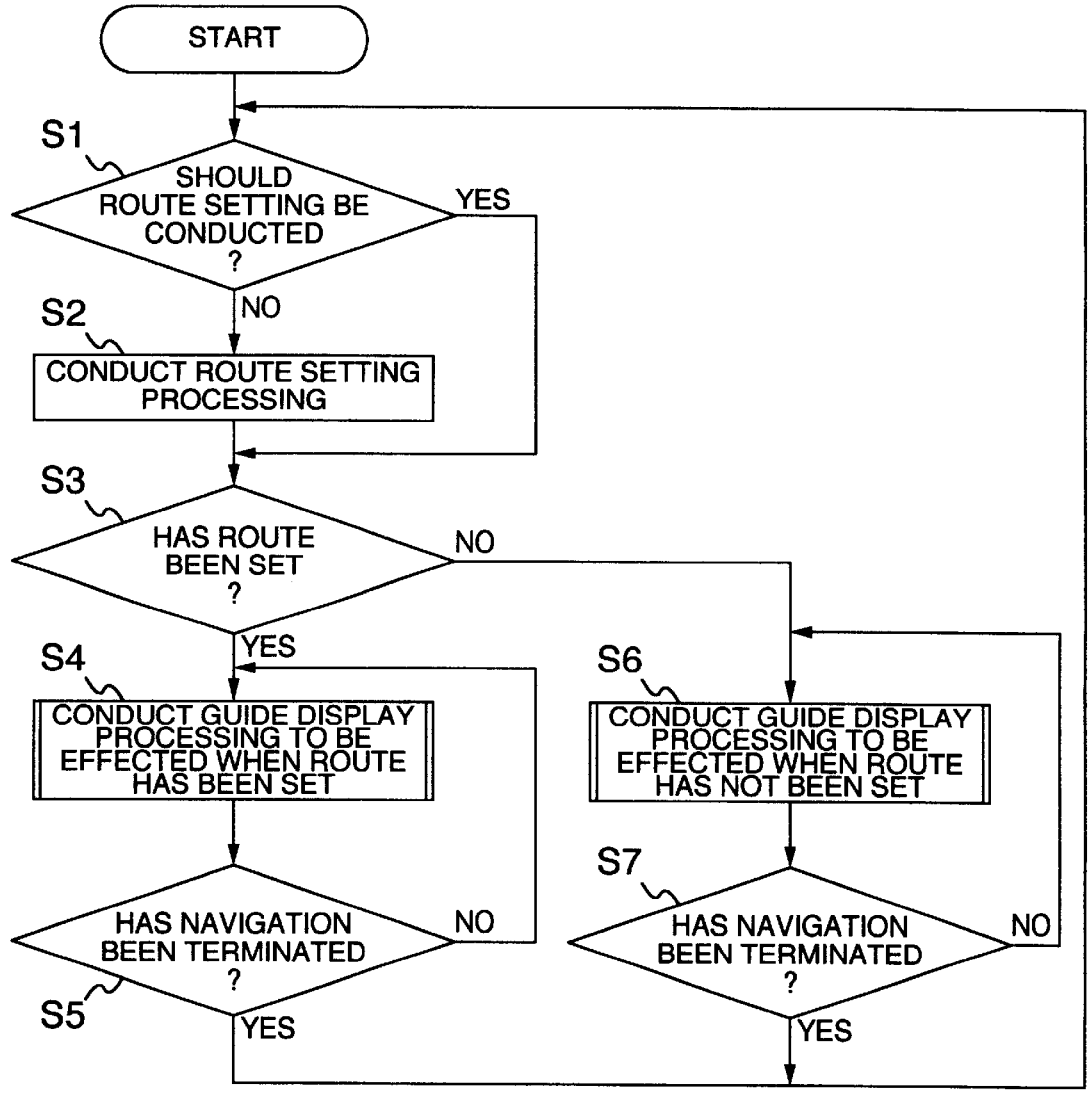
FIG. 3 is a flow chart showing the whole operation of the car navigation apparatus in the embodiment.

FIG. 3 is a flow chart showing the whole operation of the car navigation apparatus of the present embodiment.

In case the user uses the car navigation apparatus, an instruction whether or not the route should be set is inputted from the input device 2 in the first initial state. If the instruction that the route should be set is inputted (S1), then using the CPU 1, the map display unit 34 reads out the map information around the own car position stored in the CD-ROM 7 using the CD-ROM drive 8, outputs the map information around the own car position to the graphic controller 4a, and causes the map to be displayed on the display screen 3a of the display device 3. The user specifies the departure point and the destination point on the displayed map using the input device 2. Thereupon, using the CPU 1, the route setting unit 21 determines the optimum route between the departure point and the destination point based on the map information acquired from the CD-ROM 7, stores the optimum route in the RAM 10, and displays the optimum route on the display screen 3a of the display device 3 (S2). At this time, the display screen 3a is divided into two areas (i.e., the map display area 40a and the detailed information display area 40b) to display them as shown in FIGS. 4A, 4B, 5A and 5B, so that the map and the route are displayed in the map display area 40a.

If the route has been set by the above-described operation (S3), a guide display processing when the route is set is conducted (S4). The guide display processing when the route is set will be described later. If there is not the termination of the navigation caused by the arrival of the own car at the destination, the input of an interruption instruction performed by the user, or the like (S5), then the step S4 is repeated. If the navigation has been terminated (S5), then the processing returns to the operation of the step S1.

If the instruction that the route should be set is not inputted at step S1, then the route is not set (S3), and a guide display processing when the route is not set is conducted (S6). The guide display processing when the route is not set will be described later. If there is not the termination of the navigation caused by the arrival of the own car at the destination, the input of the interruption instruction performed by the user, or the like (S7), then the step S6 is repeated. If the navigation has been terminated (S7), then the processing returns to the operation of the step S1.

The guide display processing when the route is set will now be described.

Figure 4A:
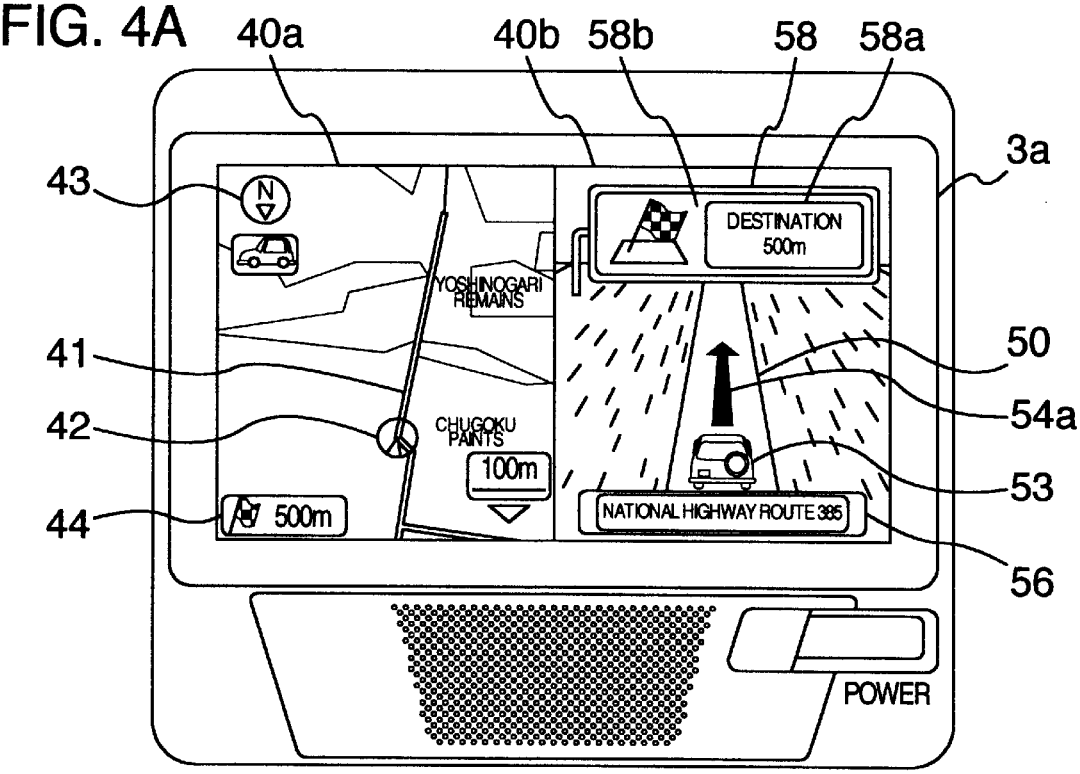
FIG. 4A is a diagram showing a guide display screen in case a route is set and there is neither a landmark nor an intersection within a predetermined distance ahead of an own car.
Figure 4B:
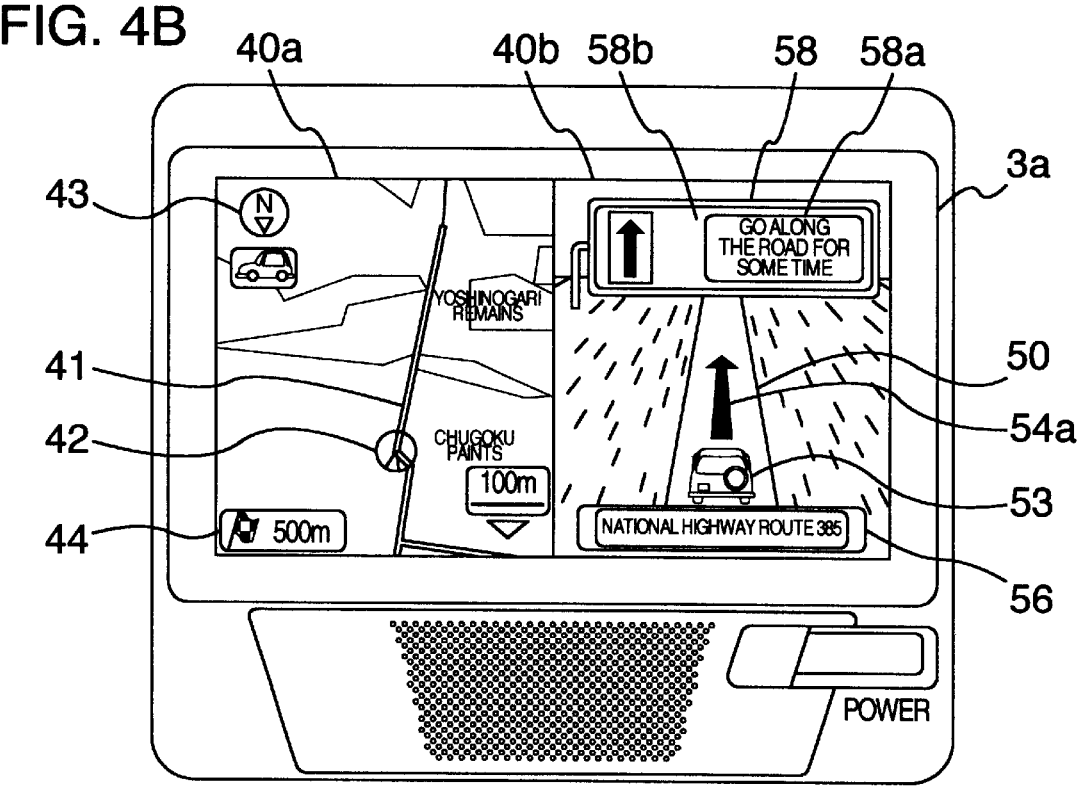
FIG. 4B is a diagram showing a guide display screen in case the route is set and there is neither a landmark nor an intersection within the predetermined distance ahead of the own car.
Figure 5A:
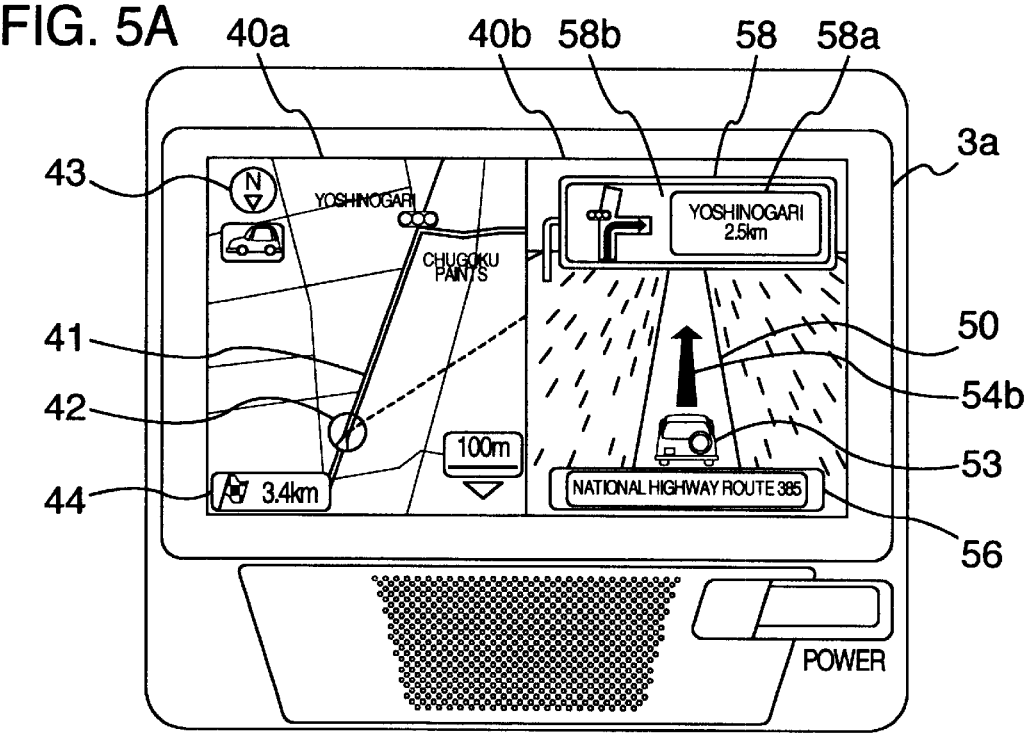
FIG. 5A is a diagram showing a guide display screen in case the route is set and there is an intersection within the predetermined distance ahead of the own car.
Figure 5B:
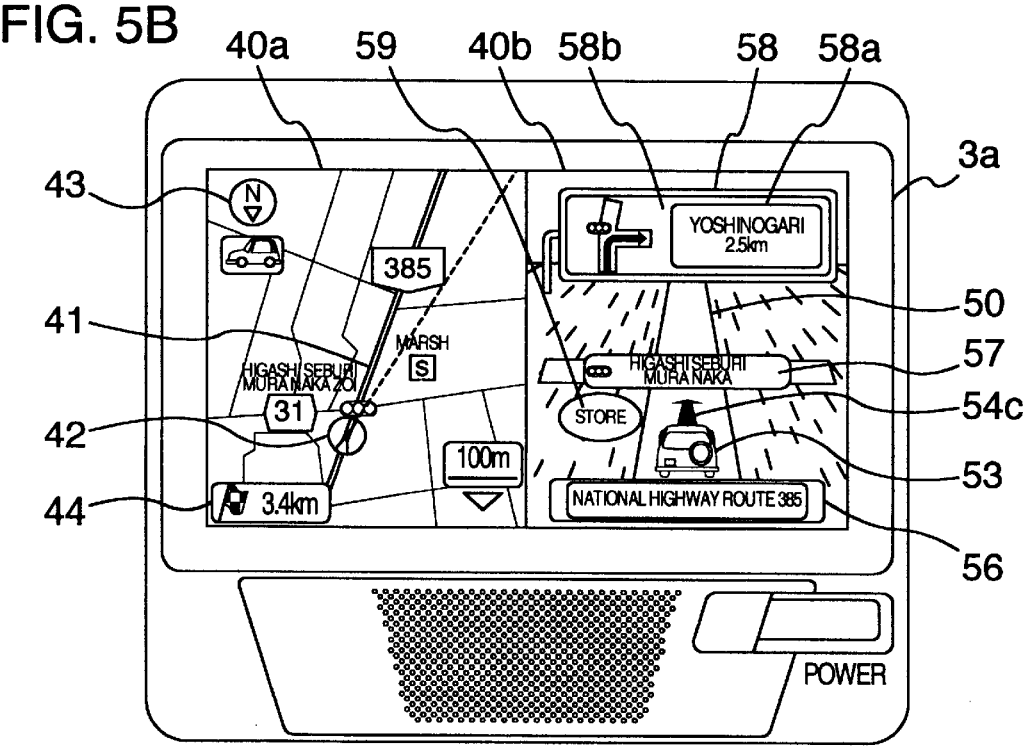
FIG. 5B is a diagram showing a guide display screen in case the route is set and there is an intersection within the predetermined distance ahead of the own car.

Each of FIGS. 4A and 4B is a diagram showing the guide display screen in case the route is set and there is neither a landmark nor an intersection within the predetermined distance ahead of the own car. Each of FIGS. 5A and 5B is a diagram showing the guide display screen in case the route is set and there is an intersection within the predetermined distance ahead of the own car.

In FIGS. 4A, 4B, 5A and 5B, reference numeral 3a denotes a display screen. Reference numeral 40a denotes a map display area which is a left hand area in the display screen 3a for displaying a wide area map around the own car position. Reference numeral 40b denotes a detailed information display area which is a right hand area in the display screen 3a for displaying the detailed information concerning the landmark or the intersection located ahead of the own car. Reference numeral 41 denotes a route displayed in the map display area 40a in order to guide the own car to the destination (i.e., a road displayed by a white-on-black road). Reference numeral 42 denotes an own car mark displayed in the map display area 40a to indicate the own car position. Reference numeral 43 denotes a bearing display mark displayed in the upper left hand corner to indicate the north of the map displayed in the map display area 40a. Reference numeral 44 denotes a destination distance display mark formed of a mark and characters displayed in the lower left hand corner of the map display area 40a to indicate the distance between the own car position and the destination. Reference numeral 50 denotes a road shape display figure for displaying the shape of a road located immediately ahead of the own car in the detailed information display area 40b. Reference numeral 53 denotes an own car display figure displayed near the center of a lower portion in the detailed information display area 40b. Each of reference numerals 54a, 54b and 54c denotes an arrow displayed on the road shape display figure 50 in the detailed information display area 40b to indicate the advance direction of the own car. Reference numeral 56 denotes a road name display area which is an area provided in the lower portion of the own car display figure 53 in the detailed information display area 40b to display a road name of a road on which the own car is currently running. Reference numeral 57 denotes an intersection name display area which is an area provided in the detailed information display area 40b to display a nearest intersection name when the own car has come within 100 m from the nearest intersection. Reference numeral 58 denotes an information display area provided in an upper part of the detailed information display area 40b to display information such as the distance to the destination, the distance to a turning intersection, a turning intersection name, the shape of the turning intersection, or the turning direction. Reference numeral 58a denotes a character information display area provided in a right hand part of the information display area 58 to display a turning intersection name, the distance to the destination, and the distance to the turning intersection. Reference numeral 58b denotes an intersection figure information display area provided in a left hand part of the information display area 58 to display illustration of the shape of the turning intersection, the turning direction, or the like. Reference numeral 59 denotes a landmark symbol displayed in the detailed information display area 40b when the own car has come within a predetermined distance from a landmark.

The road shape display figure 50 is a figure imitating a bird's-eye view obtained when the forward road is seen from the own car. The figure has a shape which can be intuitively understood with ease by the user. Furthermore, the intersection name display area 57 is disposed in the center of the road shape display figure 50.

Figure 6:
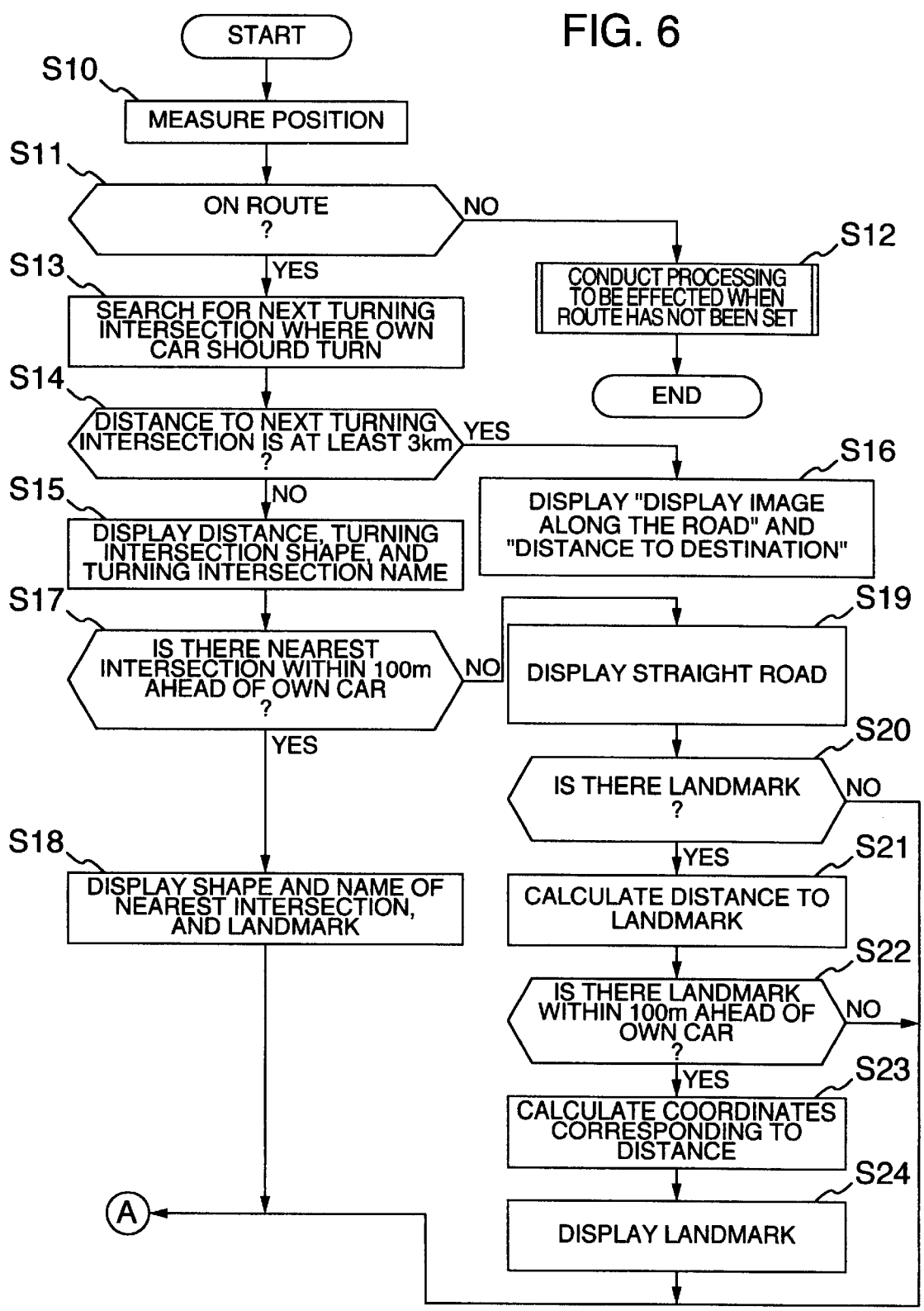
FIG. 6 is a flow chart representing a guide display processing conducted when the route is set.
Figure 7:
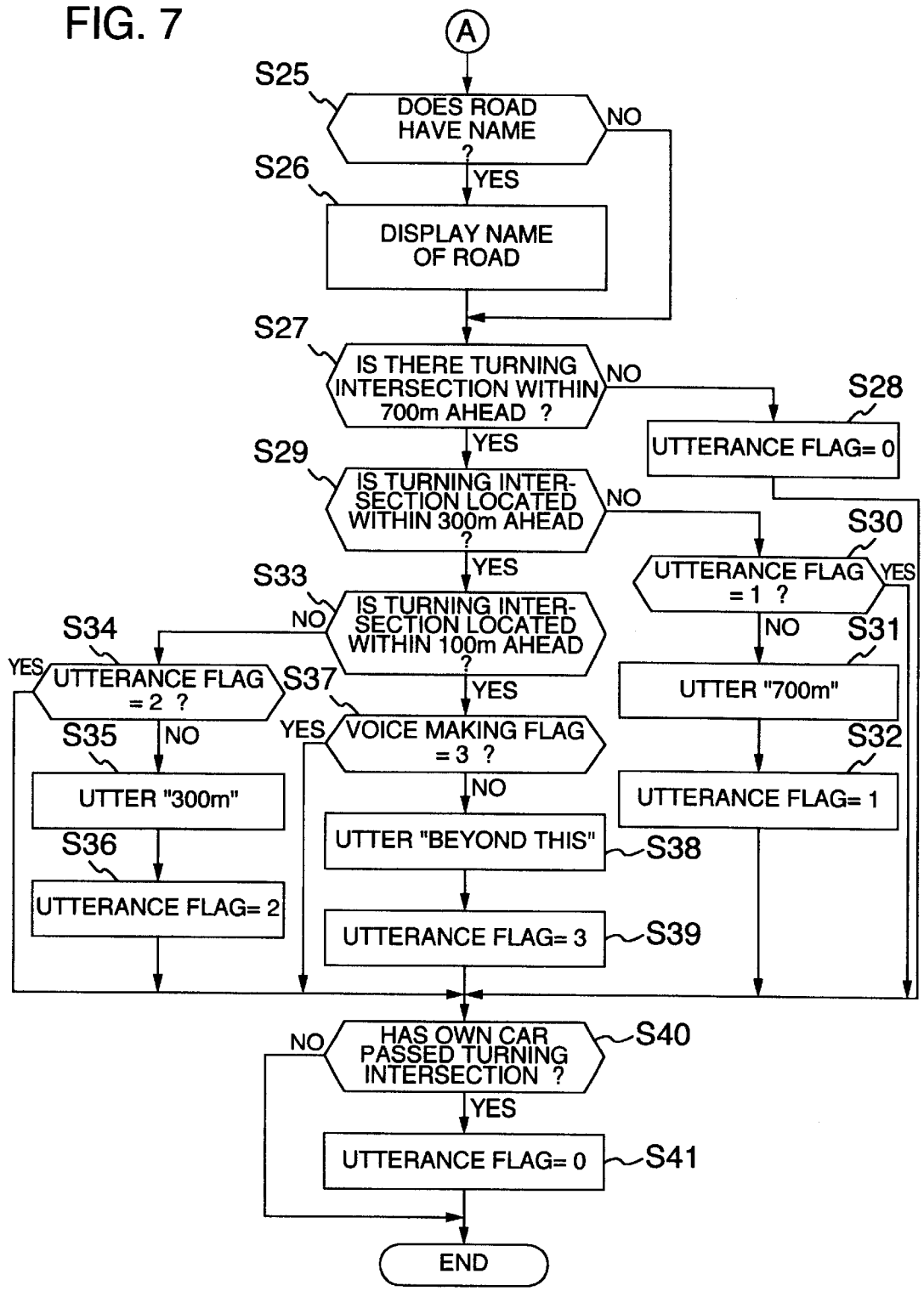
FIG. 7 is a flow chart representing the guide display processing conducted when the route is set.
Figure 8:
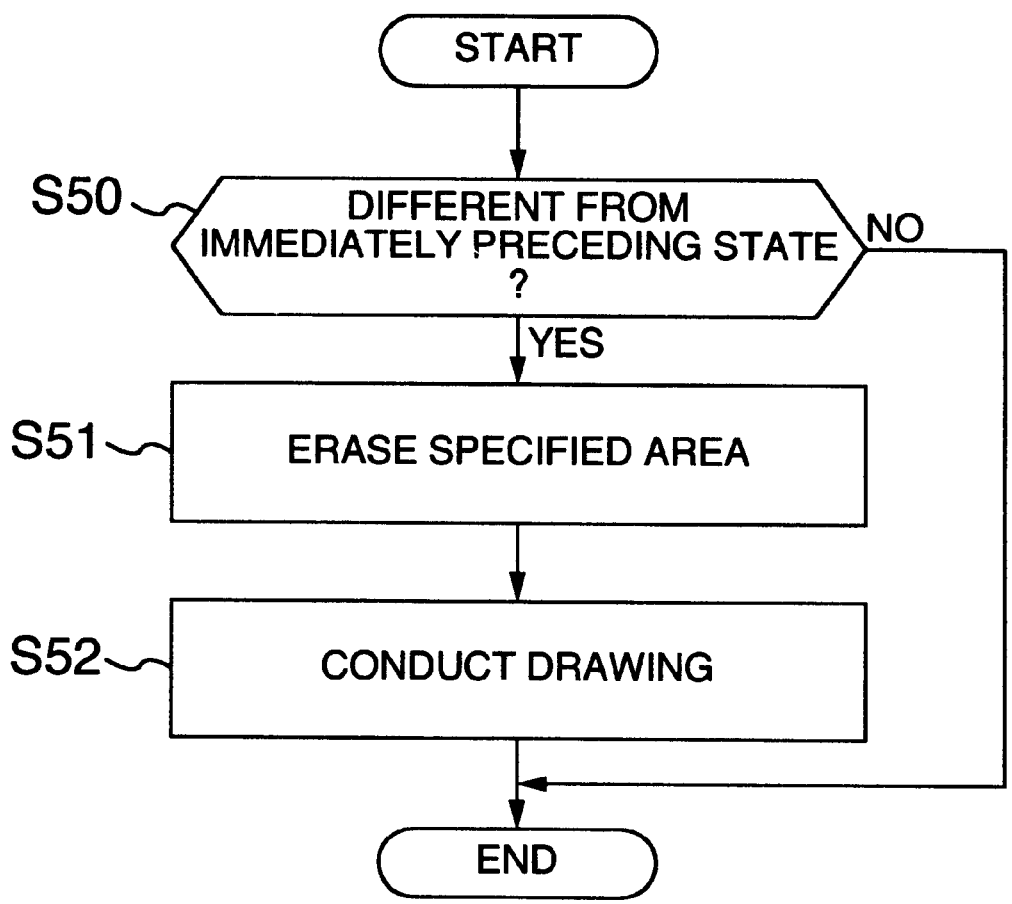
FIG. 8 is a flow chart representing the operation of a graphic controller.

Each of FIGS. 6 and 7 is a flow chart representing the guide display processing when the route is set. FIG. 8 is a flow chart representing the operation of the graphic controller.

If the route has been set by the route setting unit 21 in the above-described operation (S3), then the own car position detection unit 22 calculates the distances to the respective GPS satellites based on the radio wave transmission times from a plurality of GPS satellites included in the navigation radio waves received by the GPS receiver 5, the earth-circling orbit, and the arrival times of the received radio waves, and detects the own car position (S10). At this time, the advance direction detection unit 23 detects the advance direction of the own car from the temporal change of the own car position detected by the own car position detection unit 22.

Subsequently, the CPU 1 determines whether or not the own car position is on the set route. If the own car is not on the set route (S11), then the guide display processing when the route is not set (described later) is conducted (S12), and the processing is terminated.

If the own car position is on the set route (S11), then using the CPU 1, the turning intersection detection unit 24 searches for a turning intersection located on the route of the advance direction of the own car based on the advance direction of the own car detected by the advance direction detection unit 23 and the route information stored in the RAM 10 (S13).

Subsequently, if the distance between the own car position and the turning intersection is at least 3 km or a turning intersection is not found as far as the destination (S14), the turning intersection detection unit 24 outputs a turning intersection detection signal in its non-detection state to the turning intersection information acquisition unit 26. If the turning intersection detection signal is in the non-detection state, the turning intersection information acquisition unit 26 determines whether or not there is the destination within 3 km from the own car position, based on the map information and the route information. If there is the destination within 3 km from the own car position, then the turning intersection information acquisition unit 26 instructs the turning intersection display unit 27 to display the destination. If there is not the destination within 3 km from the own car position, then the turning intersection information acquisition unit 26 instructs the turning intersection display unit 27 to display going along the road. Upon being instructed to display the destination, the turning intersection display unit 27 reads out the graphics data of "destination display image" from the ROM 9 and sends the graphics data to the graphic controller 4a, using the CPU 1. The graphic controller 4a displays the graphics data of the "destination display image" in the intersection figure information display area 58b of the display screen 3a. Subsequently, the turning intersection display unit 27 causes the distance calculation unit 25 to calculate the distance between the own car position and the destination, and displays the distance in the character information display area 58a. Here, the "destination display image" is an image as shown in, for example, the intersection figure information display area 58b of FIG. 4A. Furthermore, upon being instructed to display going along the road, the turning intersection display unit 27 reads out the graphics data of "display image along the road" from the ROM 9 and sends the graphics data to the graphic controller 4a, using the CPU 1. The graphic controller 4a displays the graphics data of the "display image along the road" in the intersection figure information display area 58b of the display screen 3a, and displays a directive that the own car should go along the road (such as, for example, "go along the road for some time" as shown in FIG. 4B) in the character information display area 58a using the characters (S16).

Here, the graphic controller 4a conducts the image data display processing using the operation as shown in FIG. 8.

The graphic controller 4a stores the graphic data such as the background, the own car mark 53, the road name display area 56, and the information display area 58 to be displayed in the detailed information display area 40b, in the video RAM 4b in a plurality of hierarchical classes. In the case of drawing, the graphic controller checks the display screen by dividing it into a plurality of areas. If an area is different from its immediately preceding state (S50), then the graphic controller 4a erases the display image of the area (S51) and draws a new image (S52).

By thus conducting such a processing as to rewrite only the portion in which the image has been changed, in the drawn image on the display screen 3a, the flicker of the image is suppressed and the image display for the user to see easily can be conducted.

If the distance between the own car position and the turning intersection is shorter than 3 km at the step S14, the turning intersection detection unit 24 outputs the turning intersection detection signal in its detection state to the turning intersection information acquisition unit 26. Upon the turning intersection detection signal assuming its detection state, the turning intersection information acquisition unit 26 acquires the information concerning the shape of the turning intersection, the turning intersection name, and the turning direction from the map information using the CPU 1. Using the CPU 1, the turning intersection display unit 27 then reads out the graphics data of the turning intersection road shape display figure corresponding to the acquired shape and the turning direction of the turning intersection from the ROM 9, transmits the graphics data to the graphic controller 4a, and displays the graphics data in the intersection figure information display area 58b (see FIGS. 5A and 5B). Subsequently, the turning intersection display unit 27 calculates the distance between the own car position and the turning intersection using the distance calculation unit 25, and displays the turning intersection name and the distance between the own car position and the turning intersection in the character information display area 58a (S15).

If there is the turning intersection within 3 km ahead of the own car, then the shape of the turning intersection and the turning direction are displayed in the information display area 58 using the figures, and the turning intersection name and the distance to the turning intersection are displayed in it using the characters. If there is not a turning intersection within 3 km ahead of the own car and there is the destination within 3 km ahead of the own car, then the distance to the destination is displayed in the information display area 58. If there is not a turning intersection within 3 km ahead of the own car and there is not the destination within 3 km ahead of the own car, then the command that the own car should go along the road is displayed in the information display area 58.

Using the CPU 1, the nearest intersection detection unit 31 searches for the nearest intersection located ahead of the own car (hereafter referred to as "nearest intersection") based on the advance direction detected by the advance direction detection unit 23. If the nearest intersection is detected ahead of the own car by the nearest intersection detection unit 31, then using the CPU 1, the nearest intersection information acquisition unit 32 reads out the map information stored in the CD-ROM 7 via the CD-ROM drive 8, acquires the information concerning the shape of the nearest intersection, the nearest intersection name, and the position and name of the landmark existing in the nearest intersection from the map information, and outputs them to the forward road shape display unit 33. If the nearest intersection point is not detected ahead of the own car by the nearest intersection detection unit 31, the nearest intersection information acquisition unit 32 notifies the forward road shape display unit 33 that there is not the nearest intersection. Upon the nearest intersection name being inputted from the nearest intersection information acquisition unit 32, the forward road shape display unit 33 causes the distance calculation unit 25 to calculate the distance between the own car position and the nearest intersection. If the nearest intersection is located within 100 m ahead of the own car (S17), then using the CPU 1, the forward road shape display unit 33 reads out the map information stored in the CD-ROM 7 via the CD-ROM drive 8 and acquires the information concerning the shape of the nearest intersection and the nearest intersection name from the map information. Using the CPU 1, the forward road shape display unit 33 then reads out the road shape display figure 50 having a shape corresponding to the acquired information concerning the shape of the nearest intersection, and the graphics data of the landmark symbol 59 indicating the landmark existing in the nearest intersection from the ROM 9, transmits them to the graphic controller 4a, and displays the road shape display figure 50 and the landmark symbol 59 in the detailed information display area 40b. Furthermore, the forward road shape display unit 33 transmits the name of the nearest intersection, displays the name of the nearest intersection in the intersection name display area 57, and displays the name of the landmark in the landmark symbol 59 (S18). The processing proceeds to the next step (step S25).

If at the step S17 there is not the nearest intersection ahead of the own car, or the nearest intersection is not located within 100 m ahead of the own car, then using the CPU 1, the forward road shape display unit 33 reads out the graphics data of the road shape display figure 50 having a straight road shape from the ROM 9, transmits the graphics data to the graphic controller 4a, and displays the road shape display figure 50 in the detailed information display area 40b (S19).

Using the CPU 1, the landmark detection unit 28 searches for the landmark on the road located ahead of the own car based on the advance direction detected by the advance direction detection unit 23.

If there is not the landmark on the road (S20), the processing proceeds to the next step without conducting anything.

If there is the landmark on the road (S20), then using the CPU 1, the landmark display unit 29 reads out the map information stored in the CD-ROM 7 via the CD-ROM drive 8, and acquires the information concerning the name and coordinates of the landmark from the map information. Subsequently, using the distance calculation unit 25, the landmark display unit 29 detects the distance between the current position of the own car and the landmark (S21). If there is the landmark within 100 m ahead of the own car (S22), then the landmark display unit 29 calculates the graphics coordinates on the detailed information display area 40b for the road shape display figure 50 displayed in the detailed information display area 40b (S23). Using the CPU 1, the landmark display unit 29 reads out the graphics data of the landmark symbol 59 from the ROM 9, transmits the graphics data to the graphic controller 4a, displays the landmark symbol 59 in the position corresponding to the graphics coordinates in the detailed information display area 40b, and displays the name of the landmark in the landmark symbol 59 (S24).

The operation heretofore described results in the following processing. If there is the nearest intersection within 100 m ahead of the own car, then the shape and name of the nearest intersection are displayed in the detailed information display area 40b as a figure imitating a bird's-eye view as shown in FIG. 5B. If there is not the nearest intersection within 100 m ahead of the own car, a figure of a straight road imitating a bird's-eye view is displayed as shown in FIGS. 4A, 4B and 5A. Furthermore, if there is the landmark within 100 m ahead of the own car, then the shape and name of the landmark are displayed along the road shape display figure 50 in the detailed information display area 40b as shown in FIG. 5B.

Subsequently, on the basis of the map information data acquired from the CD-ROM 7, the forward road shape display unit 33 finds out the name of the road on which the own car is located. If the road has the name (S25), then the forward road shape display unit 33 displays the name of the road in the road name display area 56 (S26).

Subsequently, on the basis of the distance detected by the distance calculation unit 25, the voice notice unit 36 determines whether or not there is a turning intersection within 700 m ahead of the own car. If there is not a turning intersection within 700 m ahead of the own car (S27), then the voice notice unit 36 sets an utterance flag stored in the RAM 10 to "0" (S28), and the processing proceeds to the next step.

If it is determined at the step S27 that there is a turning intersection within 700 m ahead of the own car, then the voice notice unit 36 determines whether or not the turning intersection is located within 300 m ahead of the own car. If the turning intersection is not located within 300 m ahead of the own car (S29), then the voice notice unit 36 checks the utterance flag stored in the RAM 10. If the utterance flag is not "1" (S30), then the voice notice unit 36 utters a voice using the speaker 12 to inform the user that the own car has come within 700 m from the turning intersection (S31), and sets the utterance flag to "1" (S32).

If it is determined at the step S29 that the turning intersection is located within 300 m ahead of the own car, then the voice notice unit 36 determines whether or not the turning intersection is located within 100 m ahead of the own car. If the turning intersection is not located within 100 m ahead of the own car (S33), then the voice notice unit 36 checks the utterance flag stored in the RAM 10. If the utterance flag is not "2" (S30), then the voice notice unit 36 utters a voice using the speaker 12 to inform the user that the own car has come within 300 m from the turning intersection (S35), and sets the utterance flag to "2" (S36).

If it is determined at the step S33 that the turning intersection is located within 100 m ahead of the own car, then the voice notice unit 36 checks the utterance flag stored in the RAM 10. If the utterance flag is not "3" (S37), then the voice notice unit 36 utters a voice using the speaker 12 to inform the user that the own car has come within 100 m from the turning intersection (S38), and sets the utterance flag to "3" (S39).

The operation heretofore described results in the following processing. Immediately after the own car has come within 700 m from the turning intersection, the utterance is given only once to notify that the own car has come within 700 m from the turning intersection. Immediately after the own car has come within 300 m from the turning intersection, the utterance is given only once to notify that the own car has come within 300 m from the turning intersection. Immediately after the own car has come within 100 m from the turning intersection, the utterance is given only once to notify that the own car has come within 100 m from the turning intersection.

Subsequently, the voice notice unit 36 determines whether or not the own car has arrived at the turning intersection. If the own car position has arrived at the turning intersection (S40), then the voice notice unit 36 sets the utterance flag stored in the RAM 10 to "0" (S41).

A series of operations heretofore described are the guide processing when the route is set.

By the way, in the above-described operation of the steps S27 to S41, the utterance is conducted when the own car comes within 700 m from the turning intersection, when the own car comes within 300 m from the turning intersection, and when the own car comes within 100 m from the turning intersection, as an example. However, the distance and times of the utterance are not restricted thereto.

The guide display processing when the route is not set will now be described.

Figure 9A:
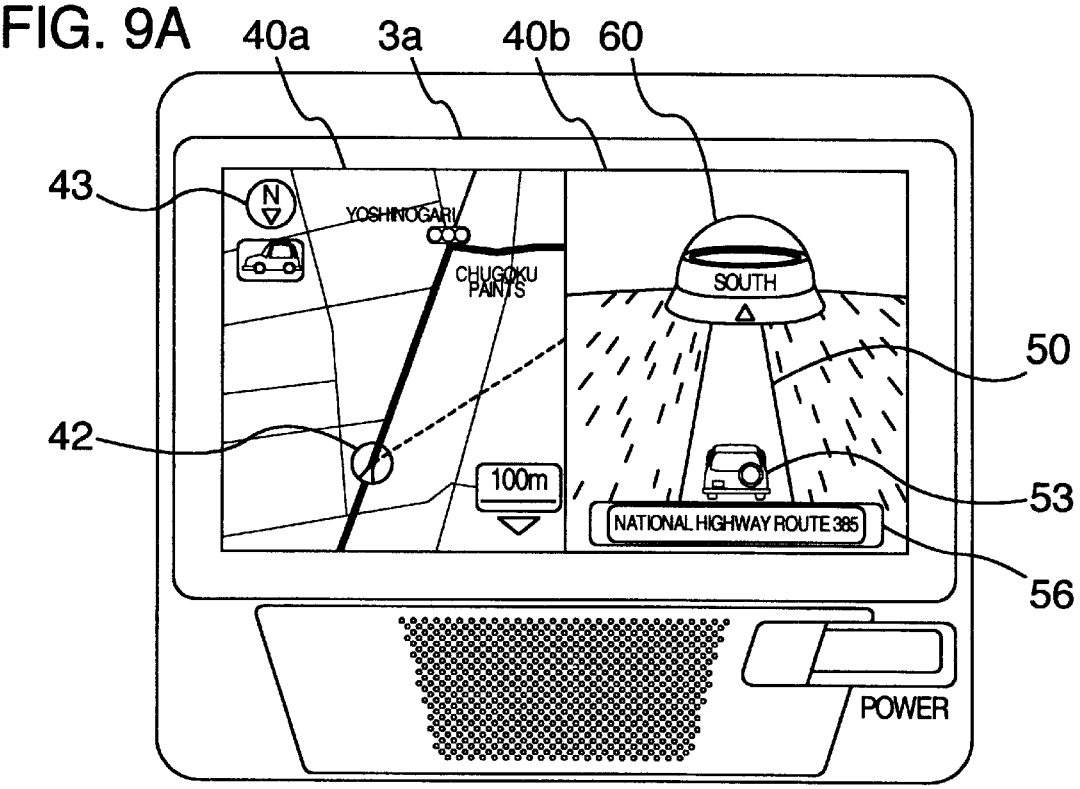
FIG. 9A is a diagram showing a guide display screen in case the route is not set and there is neither a landmark nor an intersection within the predetermined distance ahead of the own car.
Figure 9B:
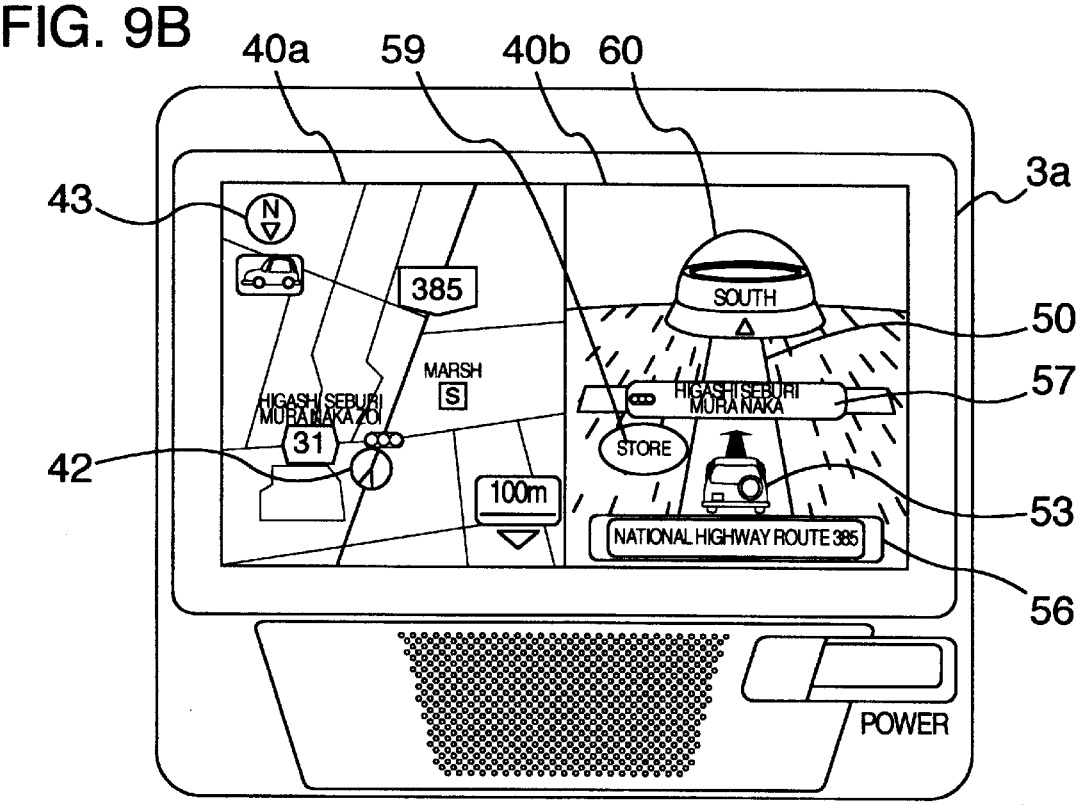
FIG. 9B is a diagram showing a guide display screen in case the route is not set and there are a landmark and an intersection within the predetermined distance ahead of an own car.

FIG. 9A is a diagram showing the guide display screen in case the route is not set and there is neither a landmark nor an intersection within the predetermined distance ahead of the own car. FIG. 9B is a diagram showing the guide display screen in case the route is not set and there are the landmark and the intersection within the predetermined distance ahead of the own car.

In FIGS. 9A and 9B, Reference numeral 3a denotes a display screen. Reference numeral 40a denotes a map display area. Reference numeral 40b denotes a detailed information display area. Reference numeral 42 denotes an own car symbol. Reference numeral 43 denotes a bearing display symbol. Reference numeral 50 denotes a road shape display figure. Reference numeral 53 denotes an own car display figure. Reference numeral 56 denotes a road name display area. Reference numeral 57 denotes an intersection name display area. Reference numeral 59 denotes a landmark symbol. These are similar to the same components shown in FIGS. 4A, 4B, 5A and 5B, and consequently they are denoted by the like reference numerals and description of them will be omitted.

Reference numeral 60 denotes an advance direction indication symbol disposed in the upper center portion of the detailed information display area 40b to indicate the advance direction of the own car in one of eight directions. The advance direction of the own car is indicated by characters in the advance direction indication symbol.

Figure 10:
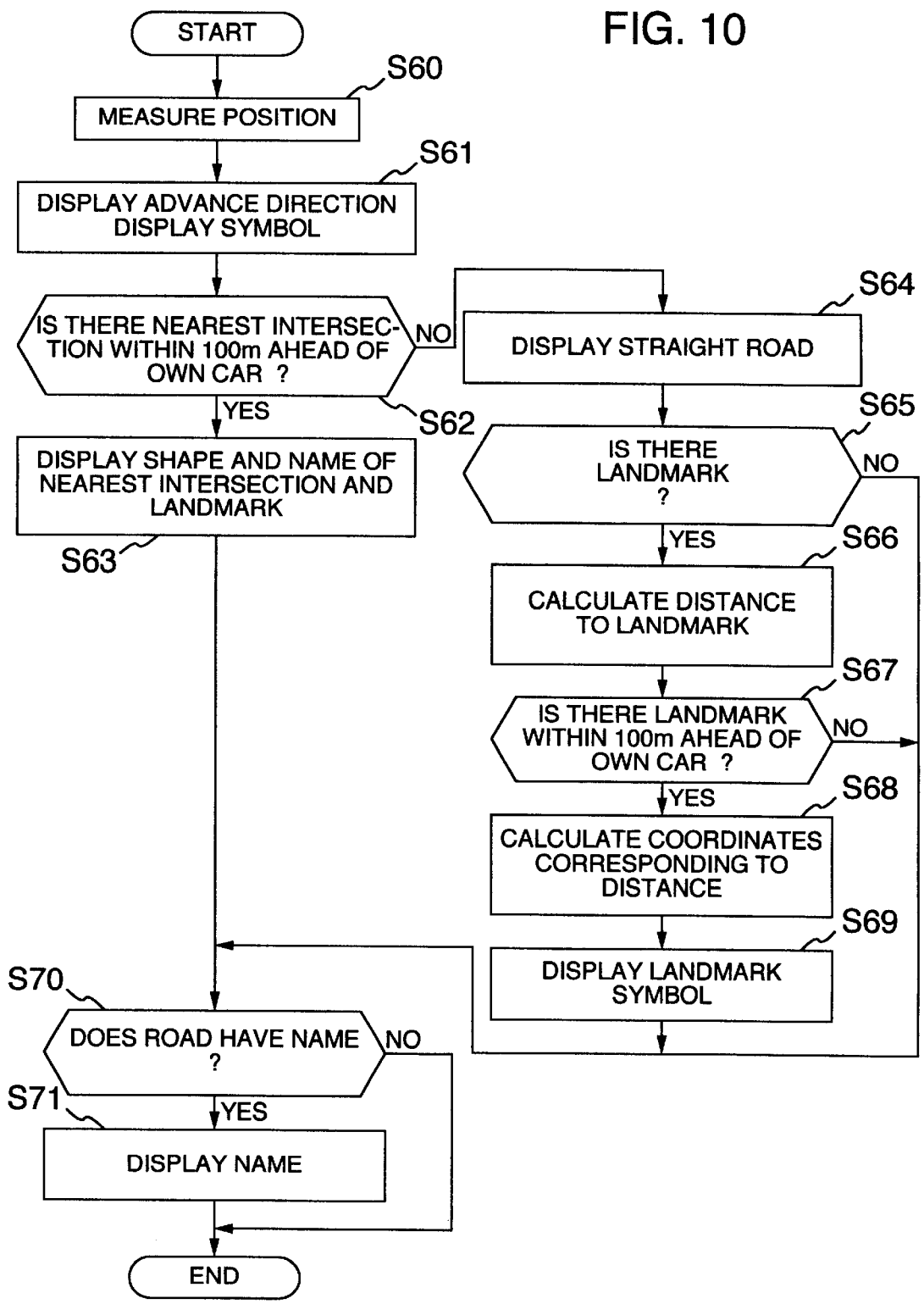
FIG. 10 is a flow chart representing a guide display processing conducted when the route is not set.
Figure 11A:
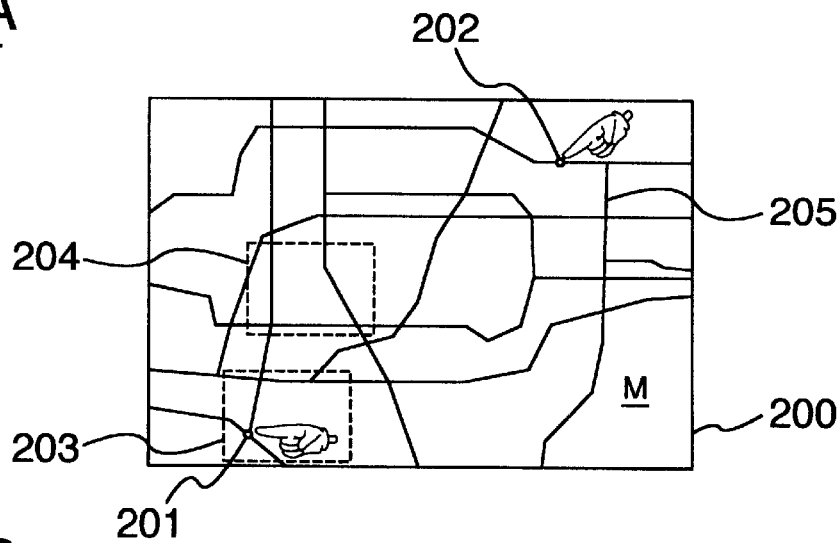
FIG. 11A is a diagram showing an example of a wide area diagram displayed on the display screen of the car navigation apparatus to be mounted on car disclosed in JP-A-6-186051.
Figure 11B:
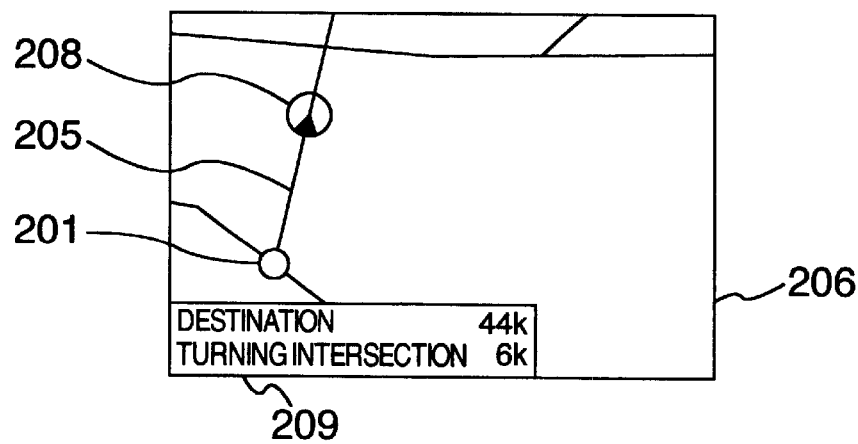
FIG. 11B is an enlarged view showing an enlarged view of a partial area of the wide area diagram shown in FIG. 11A.
Figure 11C:
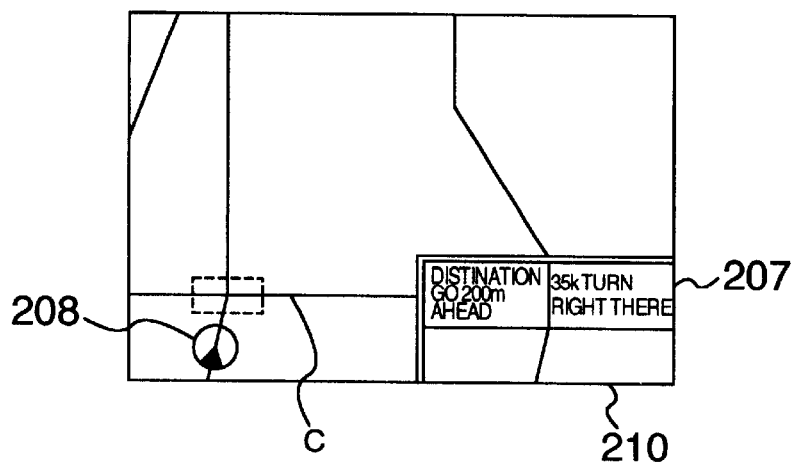
FIG. 11C is an enlarged view showing an enlarged view of a partial area of the wide area diagram shown in FIG. 11A.

FIG. 10 is a flow chart representing the guide display processing when the route is not set.

If the route has not been set (S3), then the own car position detection unit 22 first calculates the distances to respective GPS satellites based on the radio wave transmission times from a plurality of GPS satellites included in the navigation radio waves received by the GPS receiver 5, the earth-circling orbit, and the arrival times of the received radio waves, and outputs the coordinates of the own car (S10). At this time, the advance direction detection unit 23 detects the advance direction of the own car from the temporal change of the own car position detected by the own car position detection unit 22.

Subsequently, using the CPU 1, the advance direction display unit 30 determines which of the eight bearings the advance direction detected by the advance direction detection unit 23 corresponds to. Using the CPU 1, the advance direction display unit 30 reads the graphics data of the advance direction display symbol 60 stored in the ROM 9, sends the graphics data to the graphic controller 4a, displays the advance direction display symbol 60 in the detailed information display area 40b, and displays the bearing in the advance direction display symbol 60 using the characters (S61).

By the operation heretofore described, the advance direction display symbol 60 is displayed in the detailed information display area 40b, and the bearing indicating the advance direction of the own car is displayed in the advance direction display symbol 60.

Using the CPU 1, the nearest intersection detection unit 31 searches for the nearest intersection located ahead of the own car based on the advance direction detected by the advance direction detection unit 23. If the nearest intersection is detected by the nearest intersection detection unit 31, then using the CPU 1, the nearest intersection information acquisition unit 32 reads out the map information stored in the CD-ROM 7 via the CD-ROM drive 8, acquires the information concerning the shape of the nearest intersection, the nearest intersection name, and the position and name of the landmark existing in the nearest intersection from the map information, and outputs them to the forward road shape display unit 33. If the nearest intersection point is not detected by the nearest intersection detection unit 31, the nearest intersection information acquisition unit 32 notifies the forward road shape display unit 33 that there is not the nearest intersection. Upon the nearest intersection name being inputted from the nearest intersection information acquisition unit 32, the forward road shape display unit 33 causes the distance calculation unit 25 to calculate the distance between the own car position and the nearest intersection. If the nearest intersection is located within 100 m ahead of the own car (S62), then using the CPU 1, the forward road shape display unit 33 reads out the map information stored in the CD-ROM 7 via the CD-ROM drive 8 and acquires the information concerning the shape of the nearest intersection and the nearest intersection name from the map information. Using the CPU 1, the forward road shape display unit 33 then reads out the road shape display figure 50 having a shape corresponding to the acquired information concerning the shape of the nearest intersection, and the graphics data of the landmark symbol 59 indicating the landmark existing in the nearest intersection from the ROM 9, transmits them to the graphic controller 4a, and displays the road shape display figure 50 and the landmark symbol 59 in the detailed information display area 40b. Furthermore, the forward road shape display unit 33 transmits the name of the nearest intersection, displays the name of the nearest intersection in the intersection name display area 57, and displays the name of the landmark in the landmark symbol 59 (S63). The processing proceeds to the next step (S70).

If at the step S62 there is not the nearest intersection ahead of the own car, or the nearest intersection is not located within 100 m ahead of the own car, then using the CPU 1, the forward road shape display unit 33 reads out the graphics data of the road shape display figure 50 having a straight road shape from the ROM 9, transmits the graphics data to the graphic controller 4a, and displays the road shape display figure 50 in the detailed information display area 40b (S64). Subsequently, using the CPU 1, the landmark detection unit 28 searches for the landmark on the road located ahead of the own car based on the advance direction detected by the advance direction detection unit 23.

If the landmark is not detected on the road (S65), the processing proceeds to the next step without conducting anything.

If the landmark is detected on the road (S65), then the landmark display unit 29 reads out the map information stored in the CD-ROM 7 via the CD-ROM drive 8 and acquires the information concerning the name and coordinates of the landmark from the map information, using the CPU 1. Subsequently, using the distance calculation unit 25, the landmark display unit 29 calculates the distance between the current position of the own car and the landmark (S66). If there is the landmark within 100 m ahead of the own car (S67), then the landmark display unit 29 calculates the graphics coordinates on the detailed information display area 40b for the road shape display figure 50 displayed in the detailed information display area 40b (S68). Using the CPU 1, the landmark display unit 29 reads out the graphics data of the landmark symbol 59 from the ROM 9, transmits the graphics data to the graphic controller 4a, displays the landmark symbol 59 in the position corresponding to the graphics coordinates in the detailed information display area 40b, and displays the name of the landmark in the landmark symbol 59 (S69).

The operation heretofore described results in the following processing. If there is the nearest intersection within 100 m ahead of the own car, then the shape and name of the nearest intersection are displayed in the detailed information display area 40b as a figure imitating a bird's-eye view as shown in FIG. 9B. If there is not the nearest intersection within 100 m ahead of the own car, a figure of a straight road imitating a bird's-eye view is displayed as shown in FIG. 9A. Furthermore, if there is the landmark within 100 m ahead of the own car, then the shape and name of the landmark are displayed along the road shape display figure 50 in the detailed information display area 40b as shown in FIG. 9B.

Subsequently, on the basis of the map information data acquired from the CD-ROM 7, the forward road shape display unit 33 finds out the name of the road on which the own car is located. If the road has the name (S70), then the forward road shape display unit 33 displays the name of the road in the road name display area 56 (S71).

If there is the turning intersection within 3 km ahead of the own car, then the car navigation apparatus displays the shape of the turning intersection and the turning direction in the information display area 58 using the figures, and displays the turning intersection name and the distance to the turning intersection using the characters, as heretofore described. On this side of the turning intersection, therefore, the user can recognize the turning early. Accordingly, the user can understand beforehand how long the own car should run to arrive at the intersection, what sort of intersection it is, and to which direction the own car should turn. As a result, the user can drive the car safely without being confused before the turning intersection.

Furthermore, when the user drives the car in such a state that the route has been set and the own car has approached a point located at the predetermined distance (700 m, 300 m, and 100 m in the above described example) ahead of the turning intersection, the utterance is conducted to notify the user that the own car has come within the predetermined distance from the turning intersection. Since the user's attention is thus aroused, the user is prevented from passing through the turning intersection without turning unconsciously.

The car navigation apparatus of the present invention as heretofore described brings about the following advantageous effects.

In accordance with the first aspect of the present invention, (1) the shape of the turning intersection and the direction to which the own car should turn are displayed on the display screen using the figures. Therefore, the user can recognize the shape of the turning intersection and the direction to which the own car should turn, with extreme ease beforehand. The user is prevented from overlooking and passing through the turning intersection. As a result, it is possible to provide the car navigation apparatus capable of conducting the guide causing fewer mistakes, and consequently having high operability.

(2) Since the shape of the turning intersection and the direction to which the own car should turn are displayed on the display screen using the figures, it is easy to intuitively associate the display with the forward scenery. As a result, it is possible to provide the car navigation apparatus capable of conducting the guide causing fewer mistakes, and consequently having high operability.

In accordance with the second aspect of the present invention, (1) upon the detection of the turning intersection, the distance calculation unit calculates the distance between the own car position and the turning intersection, and the turning intersection information acquisition unit acquires the shape and name of the turning intersection from the map information. Subsequently, the turning intersection display unit displays the shape of the turning intersection and the direction to which the own car should turn, on the display screen using figures, and displays the distance to the turning intersection and the name of the turning intersection on the display screen using characters.

(2) Since the distance to the turning intersection and the name of the turning intersection are displayed on the display screen using characters, the user can confirm the turning intersection positively. As a result, it is possible to provide the car navigation apparatus capable of conducting the guide causing fewer mistakes, and consequently having high operability.

(3) Since the distance to the turning intersection is known beforehand, it is possible to prepare for turning with calmness. It is thus possible to provide the car navigation apparatus having high driving safety.

In accordance with the third aspect of the present invention, the shape of the forward intersection is compared with the shape of the turning intersection. Accordingly, it can be intuitively determined whether or not the forward intersection is the turning intersection. Furthermore, the name of the forward intersection is compared with the name of the turning intersection. Accordingly, it can be positively determined whether or not the forward intersection is the turning intersection. Therefore, the user is prevented from turning at the wrong intersection or overlooking and passing through the turning intersection. As a result, it is possible to provide the car navigation apparatus capable of conducting the guide causing fewer mistakes, and consequently having high operability.

In accordance with the fourth aspect of the present invention, the landmark symbol is displayed on the display screen. By comparing the landmark seen forward from the own car with the landmark symbol displayed on the display screen, therefore, it is possible to confirm the position of the own car. As a result, it is possible to provide the car navigation apparatus capable of conducting the guide causing fewer mistakes, and consequently having high operability.

In accordance with the fifth aspect of the present invention, the advance direction display unit displays the advance direction of the own car on the display screen. Accordingly, the user can easily know in which direction the own car is currently advancing. As a result, it is possible to provide the car navigation apparatus capable of conducting the guide causing fewer mistakes, and consequently having high operability.

In accordance with the sixth aspect of the present invention, the position of the own car can be grasped on the map. In addition, the shape of the turning intersection and the shape of the forward road can be intuitively grasped. As a result, it is possible to provide the car navigation apparatus capable of conducting the guide causing fewer mistakes and confirming the own car position without switching over the screen, and consequently having high operability.

In accordance with the seventh aspect of the present invention, the user can be notified that the own car has approached the turning intersection. Accordingly, the positive guide becomes possible. As a result, it is possible to provide the car navigation apparatus having high operability.

Furthermore, the guide display method for car navigation apparatus according to the present invention brings about the following advantageous effects.

In accordance with the eighth aspect of the present invention, (1) the shape of the turning intersection and the direction to which the own car should turn are displayed on the display screen using figures. Therefore, the user can recognize the shape of the turning intersection and the direction to which the own car should turn, with extreme ease beforehand. The user is prevented from turning at the wrong intersection or overlooking and passing through the turning intersection. As a result, it is possible to provide the car navigation method for car navigation apparatus capable of conducting the guide causing fewer mistakes.

(2) Since the shape of the turning intersection and the direction to which the own car should turn are displayed on the display screen using figures, it is easy to intuitively associate the display with the forward scenery. As a result, it is possible to provide the car navigation method for car navigation apparatus capable of conducting the guide causing fewer mistakes.

In accordance with the ninth aspect of the present invention, (1) the distance to the turning intersection and the name of the turning intersection are displayed on the display screen using characters. Accordingly, the user can confirm the turning intersection positively. As a result, it is possible to provide the car navigation method for car navigation apparatus capable of conducting the guide causing fewer mistakes.

(2) Since the distance to the turning intersection is known beforehand, it is possible to prepare for turning with calmness. It is thus possible to provide the car navigation method for car navigation apparatus capable of improving the driving safety.

In accordance with the tenth aspect of the present invention, the shape of the forward intersection is compared with the shape of the turning intersection. Accordingly, it can be intuitively determined whether or not the forward intersection is the turning intersection. Furthermore, the name of the forward intersection is compared with the name of the turning intersection. Accordingly, it can be positively determined whether or not the forward intersection is the turning intersection. Therefore, the user is prevented from turning at the wrong intersection or overlooking and passing through the turning intersection. As a result, it is possible to provide the car navigation method for car navigation apparatus capable of conducting the guide causing fewer mistakes.

In accordance with the eleventh aspect of the present invention, the landmark symbol is displayed on the display screen. By comparing the landmark seen forward from the own car with the landmark symbol displayed on the display screen, therefore, it is possible to confirm the position of the own car. As a result, it is possible to provide the car navigation method for car navigation apparatus capable of conducting the guide causing fewer mistakes.

In accordance with the twelfth aspect of the present invention, the advance direction display unit displays the advance direction of the own car on the display screen. Accordingly, the user can easily know in which direction the own car is currently advancing. As a result, it is possible to provide the car navigation method for car navigation apparatus capable of conducting the guide causing fewer mistakes.

What is claimed is:

1. A car navigation apparatus, comprising:
    a display screen for displaying information;
    a map information storage unit for storing map information;
    route setting means for setting a route from a departure point to a destination point based on said map information;
    car position detection means for measuring a position of a car and for detecting said car position;
    advance direction detection means for detecting an advance direction of the car from a temporal change of said car position;
    turning intersection detection means for detecting an intersection where the car should turn next time, on said route located within a predetermined distance in said advance direction from said car position, based on said map information;
    turning intersection information acquisition means responsive to detection of said turning intersection to acquire a shape of said turning intersection from said map information;
    turning intersection display means for displaying the shape of said turning intersection acquired by said turning intersection information acquisition means and a direction to which the car should turn, on said display screen using figures; and
    distance calculation means responsive to the detection of said turning intersection to calculate a distance between said car position and said turning intersection, wherein:
        said turning intersection information acquisition means acquires a shape and a name of said turning intersection from said map information when said turning intersection is detected; and
        said turning intersection display means displays the distance to said turning intersection which is calculated by said distance calculation means, and the name of said turning intersection which is acquired by said turning intersection information acquisition means, on said display screen using characters.

2. A car navigation apparatus according to claim 1, further comprising:
    nearest intersection detection means for detecting a nearest intersection located nearest among intersections which are located within a predetermined distance in said advance direction from said car position, based on said map information;
    nearest intersection information acquisition means responsive to detection of said nearest intersection to acquire a shape and a name of said nearest intersection from said map information; and
    forward road shape display means responsive to non-detection of said nearest intersection to display a straight road on said display screen using figures, and responsive to detection of said nearest intersection to display the shape of said nearest intersection acquired by said nearest intersection information acquisition means on said display screen using figures and to display the name of said nearest intersection on said display screen using characters.

3. A car navigation apparatus according to claim 1, further comprising:
    landmark detection means for detecting a landmark on said route located within a predetermined distance in said advance direction from said car position based on said map information; and
    landmark display means responsive to detection of said landmark by said landmark detection means to display a landmark symbol indicating said landmark on said display screen.

4. A car navigation apparatus according to claim 1, further comprising advance direction display means for displaying said advance direction detected by said advance direction detection means on said display screen.

5. A car navigation apparatus according to claim 1, further comprising map display means for displaying a map on said display screen based on said map information, and for displaying a symbol indicating said car position on said map based on said car position detected by said car position detection means, wherein:
    said turning intersection display means conducts display in one of two areas obtained by dividing said display screen into two parts; and
    said map display means conducts display in another of the two areas obtained by dividing said display screen into two parts.

6. A car navigation apparatus according to claim 1, further comprising:
    voice output means for outputting a voice; and
    voice notice means responsive to arrival of the distance to said turning intersection calculated by said distance calculation means at a predetermined distance to utter using said voice output means to notify that said car has approached said turning intersection.

7. A car navigation apparatus, comprising:
    a display screen for displaying information;
    a map information storage unit for storing map information;
    route setting means for setting a route from a departure point to a destination point based on said map information;
    car position detection means for measuring a position of a car and for detecting said car position;
    advance direction detection means for detecting an advance direction of the car from a temporal change of said car position;
    turning intersection detection means for detecting an intersection where the car should turn next time, on said route located within a predetermined distance in said advance direction from said car position, based on said map information;
    turning intersection information acquisition means responsive to detection of said turning intersection to acquire a shape of said turning intersection from said map information;

turning intersection display means for displaying the shape of said turning intersection acquired by said turning intersection information acquisition means and a direction to which the car should turn, on said display screen using figures; and nearest intersection detection means for detecting a nearest intersection located nearest among intersections which are located within a predetermined distance in said advance direction from said car position, based on said map information;

nearest intersection information acquisition means responsive to detection of said nearest intersection to acquire a shape and a name of said nearest intersection from said map information; and forward road shape display means responsive to non-detection of said nearest intersection to display a straight road on said display screen using figures, and responsive to detection of said nearest intersection to display the shape of said nearest intersection acquired by said nearest intersection information acquisition means on said display screen using figures and to display the name of said nearest intersection on said display screen using characters.

8. A guide display method for a car navigation apparatus including a display screen for displaying information and a map information storage unit for storing map information, said guide display method comprising:

a route setting step of setting a route from a departure point to a destination point based on said map information;

a car position detection step of measuring a position of a car and detecting said car position;

an advance direction detection step of detecting an advance direction of the car from a temporal change of said car position detected in said car position detection step;

a turning intersection detection step of detecting an intersection where the car should turn next time, on said route located within a predetermined distance in said advance direction from said car position, based on said map information;

a turning intersection information acquisition step responsive to detection of said turning intersection to acquire a shape of said turning intersection from said map information;

a turning intersection display step for displaying the shape of said turning intersection acquired in said turning intersection information acquisition step and a direction to which the car should turn on, said display screen, using figures;

a distance calculation step responsive to detection of said turning intersection to calculate a distance between said car position and said turning intersection, wherein:

in response to detection of said turning intersection, a shape and a name of said turning intersection are acquired from said map information in said turning intersection information acquisition step, and in said turning intersection display step, the distance to said turning intersection calculated by said distance calculation step and the name of said turning intersection acquired by said turning intersection information acquisition step are displayed on said display screen using characters.

9. A guide display method for a car navigation apparatus according to claim 8, further comprising:

a nearest intersection detection step responsive to detection of the advance direction of the car in said advance direction detection step to detect a nearest intersection located nearest among intersections which are located within a predetermined distance in said advance direction from said car position detected in said car position detection step, based on said map information;

a nearest intersection information acquisition step responsive to detection of said nearest intersection in said nearest intersection detection step to acquire a shape and a name of said nearest intersection from said map information; and a forward road shape display step for displaying the shape of said nearest intersection acquired in said nearest intersection information acquisition step on said display screen using figures, and displaying the name of said nearest intersection on said display screen using characters.

10. A car navigation method for a car navigation apparatus according to claim 8, further comprising:

a landmark detection step of detecting a landmark on said route located within a predetermined distance in said advance direction from said car position based on said map information; and a landmark display step responsive to detection of said landmark in said landmark detection step to display a landmark symbol indicating said landmark on said display screen.

11. A car navigation method for a car navigation apparatus according to claim 8, further comprising an advance direction display step of displaying said advance direction detected in said advance direction detection step on said display screen.

12. A guide display method for a car navigation apparatus including a display screen for displaying information and a map information storage unit for storing map information, said guide display method comprising:

a route setting step of setting a route from a departure point to a destination point based on said map information;

a car position detection step of measuring a position of a car and detecting said car position;

an advance direction detection step of detecting an advance direction of the car from a temporal change of said car position detected in said car position detection step;

a turning intersection detection step of detecting an intersection where the car should turn next time, on said route located within a predetermined distance in said advance direction from said car position, based on said map information;

a turning intersection information acquisition step responsive to detection of said turning intersection to acquire a shape of said turning intersection from said map information;

a turning intersection display step for displaying the shape of said turning intersection acquired in said turning intersection information acquisition step and a direction to which the car should turn on, said display screen, using figures;

a nearest intersection detection step responsive to detection of the advance direction of the car in said advance direction detection step to detect a nearest intersection located nearest among intersections which are located within a predetermined distance in said advance direction from said car position detected in said car position detection step, based on said map information;

a nearest intersection information acquisition step responsive to detection of said nearest intersection in said nearest intersection detection step to acquire a shape and a name of said nearest intersection from said map information; and a forward road shape display step for displaying the shape of said nearest intersection acquired in said nearest intersection information acquisition step on said display screen using figures, and displaying the name of said nearest intersection on said display screen using characters.

* * * * *